United States Patent [19]

Lindman et al.

[11] 4,130,742

[45] Dec. 19, 1978

[54] SWITCH ACTUATOR FOR ONE-PIECE TELEPHONE

[75] Inventors: Börje L. Lindman, Tyresö; Carl-Axel Strömer, Bromma, both of Sweden

[73] Assignee: Telefonaktiebolaget L M Ericsson, Stockholm, Sweden

[21] Appl. No.: 778,063

[22] Filed: Mar. 16, 1977

[30] Foreign Application Priority Data

May 3, 1976 [SE] Sweden .............................. 76050343

[51] Int. Cl.$^2$ ............................................. H04M 1/08
[52] U.S. Cl. .................................................. 179/167
[58] Field of Search ........................ 179/158, 164, 167

[56] References Cited

U.S. PATENT DOCUMENTS 2,990,456  6/1961  Nise ................................. 179/165 X
3,562,447  2/1971  Bakhuizen et al. .................. 179/167

Primary Examiner—William C. Cooper
Attorney, Agent, or Firm—Hane, Roberts, Spiecens & Cohen

[57] ABSTRACT

A switch actuating device for a telephone instrument of the one piece type comprising actuating means protruding through the base portion of the instrument for actuating the off-on switch when the instrument is removed from or put on a table surface. Said projecting actuating means comprises along a peripheral outline of said base portion distributed parts, each of which cooperates with an element which actuates the contact springs of the switch. Said element is symmetrically constructed and comprises two links and two arms. The links are turnably mounted in bearings, are spring actuated and are at their ends actuated by the said actuating means.

7 Claims, 1 Drawing Figure

U.S. Patent Dec. 19, 1978 4,130,742
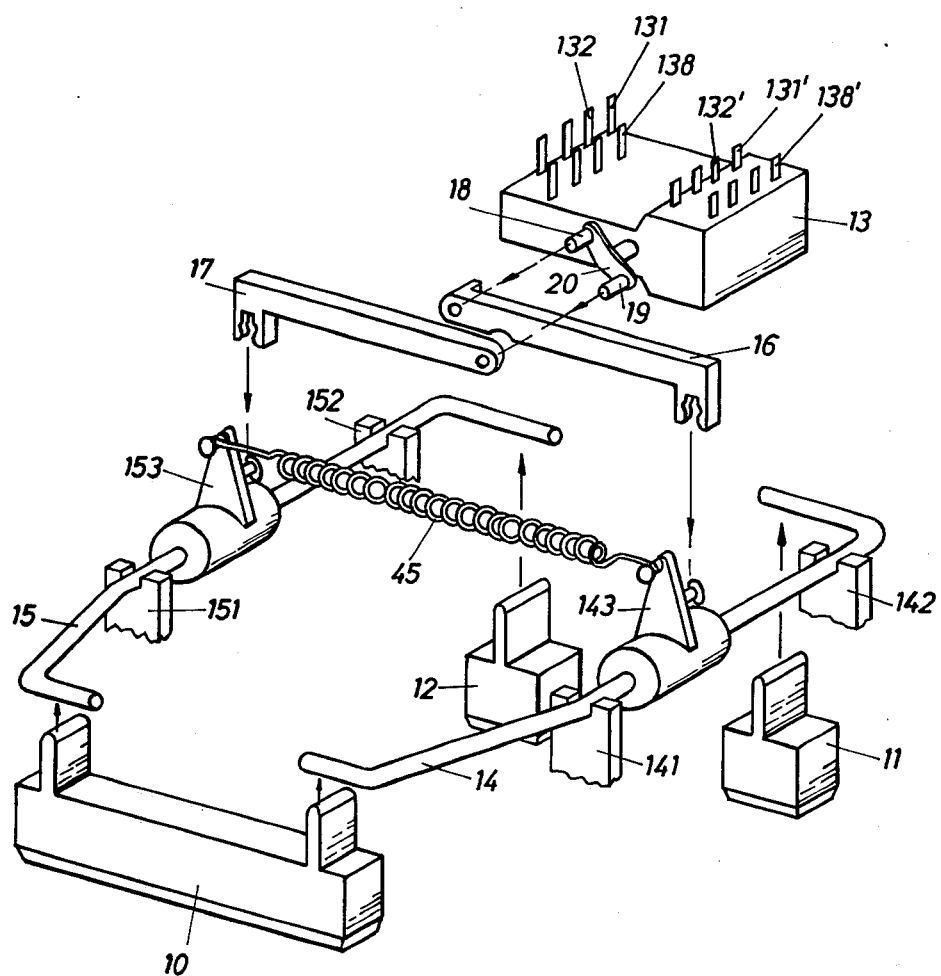

SWITCH ACTUATOR FOR ONE-PIECE TELEPHONE

The present invention relates to a switch actuating device for a telephone instrument of one piece type comprising through the base portion of the instrument projecting actuating means for actuating the switch of the instrument by the support on which the instrument is placed after a call. Said projecting actuating means comprises along a peripheral outline of said base portion distributed parts each of them cooperating with an element which actuates the contact springs of the switch for transferring the movement of the actuating means to the springs.

Arrangements of said kind are specially suited in such cases where it is desired to secure correct switch function also when the support is uneven. By the present invention embodiments are disclosed which are extremely simple in their construction and safe in their function and they are, furthermore, easy to adapt to the minimized, compact units which are included in modern telephone instruments.

The novel features of a switch actuating device according to the invention appear from the enclosed claims. The invention will be described more in detail with reference to the enclosed drawing which schematically shows an embodiment according to the invention.

On the drawing 10, 11 and 12 designate an elongated (10) and two smaller (11, 12) actuating means which when the telephone instrument is lifted, for example the instrument ERICOFON, project through the base portion of the instrument (not shown on the drawing) and when the instrument is placed on a support (table) are pressed into the instrument by the weight thereof one thus actuate elements which in turn actuate contact springs in the contact means of the instrument. Said elements are substantially symmetrically constructed and comprise two turnably mounted and spring actuated links 14, 15 which at their ends are actuated by the actuating means 10-11 and 10-12 against said spring actuation and further comprise two arms 16, 17 which are turnably mounted on each one of said two links and extend substantially perpendicular to the longitudinal direction of the links. The link 14 is mounted in two bearings 141 and 142 and has at its centre arm 143 with a holder for one of the ends of a spring 45. In the same manner the link 15 is mounted in two bearings 151 and 152 and has one arm 153 with a holder for the other end of the spring 45. Due to the spring 45 the link 14 is biased to be turned counter-clockwise and the link 15 is biased to be turned clockwise. With arrows at the actuating means 10, 11, 12 is indicated how these means actuate the links 14, 15 when the instrument is placed on a table, the link 14 then being biased to be turned clockwise and the link 15 being biased to be turned counterclockwise. With arrows at the arms 16 and 17 is indicated how these at one of their ends are turnably mounted in link 14 and 15, respectively, and at their other end are turnably mounted on a pin 18 and 19, respectively, on a turnable contact element 20 which actuates the springs of the switch 13 during the turning. The switch 13 comprises a number of movable contact springs and a number of fixed contact pieces and the extension ends 131, 132 . . . 138 of the contact springs are shown at the left and the connection ends 131', 132' . . . 138' of the contact pieces are shown at the right on the switch 13. The contact element 20 constitutes a cam shaft which is placed between the contact springs and at its turning causes the required contact functions between the contact springs and the contact elements in a conventional manner.

It is suitable to make links 14, 15 at a length which is substantially similar to the length of the base portion (about 8 cm) and an extension which substantially corresponds to the longitudinal direction of the base portion, and to make the arms 16, 17 at a length which substantially is similar to half the width (about 3.5 cm) of the base portion and an extension which substantially corresponds to the cross direction of the base portion. As appears from the drawing the inner ends of the arms 16, 17 pass each other when the telephone instrument is lifted from the support. The contact element 20 will consequently be turned clockwise when the instrument is placed on the support (table).

By the designing and placing of the links, arms, bearings and actuating means, the smallest possible friction and mechanical tensions are so that the intended switchings are obtained surely and distinctly upon handeling of the telephone instrument.

When the telephone instrument is put down only the up and down actuating means 10; for example when the actuating means 11 is pressed in, both the links 14, 15 will be turned and cause displacement of both the arms 16, 17 and thus turning of the contact element 20.

What is claimed, is:

1. A switch actuating device for a telephone instrument of the one-piece type having a base portion with a flat base surface and including a contact switch assembly for deactivating and activating the telephone instrument by placing the instrument upon a support surface and lifting the instrument respectively, said device comprising: spaced apart actuating members protruding from said flat base, each of said members being axially displaceable and biased to protrude from said flat base surface upon lifting of the instrument; and switch actuating means coacting with said axially displaceable actuating members for closing the contact switch assembly upon lifting of the telephone instrument and opening the contact switch assembly upon placing the instrument upon a support, said contact switch actuating means comprising elongate links coacting with each of said actuating members, a plurality of mounting means each supporting one of said links rotatable about its lengthwise axis; and spring means coacting with said links for biasing the same into a position in which one end of each of said links coacts with one of said axially displaceable actuating members for turning the respective links in response to the displacement of the respective link ends; and transmission means coupled with the other end of the links and with the contact switch assembly so that inward displacement of any of said actuating members causes opening of the contact switch assembly and displacement of all said actuating members into the outward position causes closing of the contact switch assembly.

2. The switch actuating device according to claim 1 wherein said spring means are attached to said links and biased to move each of said actuating members into its position protruding from said flat base surface.

3. The switch actuating device according to claim 2 wherin said mounting means are arranged for rotatably supporting the links in positions causing the links to coact with the actuating members and holders secured to each of the links rotatable in conjunction therewith, said spring means being a coil spring, each end of said coil spring being secured to one of said holders.

4. The switch actuating device according to claim 1 wherein each of said links has at each of its ends an arm portion, each of said arm portions coacting with one of said actuating members for pressing the same outwardly in response to the bias of said spring means.

5. The switch actuating device according to claim 1 wherein said transmission means comprises levers, each of said levers being coupled to one end to one of the mounting means and at the other end to the contact switch means so that the switch contact means are moved into the open position in response to any one of said actuating members being pressed inwardly.

6. The switch actuating device according to claim 5 wherein said switch actuating means comprises a movable switch control means coacting with the other end of each of said levers, said switch control means moving the contact switch means into the open position in response to inward displacement of any of the actuating members and into the contact switch closing position in response to all actuating members being in the outward position.

7. The switch actuating device according to claim 1 wherein said links are disposed lengthwise of said flat base portion and extend substantially the length thereof, said links having at each of their ends an arm extending substantially crosswise of said base portion, said arms coacting with said actuating members for causing actuation of the switch actuating assembly in response to a rotation of said links, and wherein said switch actuating assembly comprising a pair of arms coupled at one end of said switch actuating assembly and at the other end to the links, said arms coupled to said switch actuating assembly being disposed crosswise across about half the width of said base portion and extending parallel to each other, said other ends of the arms of the switch actuating assembly overlapping each other.

* * * * *